United States Statutory Invention Registration [19]

[11] Reg. Number: H363

Duvdevani et al.

[43] Published: Nov. 3, 1987

[54] DILATANT BEHAVIOR OF A SOLUTION OF A SULFONATED POLYMER

[75] Inventors: Ilan Duvdevani, Leonia; Robert D. Lundberg, Bridgewater, both of N.J.

[73] Assignee: Exxon Reseach and Engineering Company, Florham Park, N.J.

[21] Appl. No.: 808,117

[22] Filed: Dec. 12, 1985

[51] Int. Cl.[4] ..... C10L 1/14; C10L 1/24

[52] U.S. Cl. ..... 44/62; 524/481; 524/574; 524/575

[58] Field of Search ..... 44/62; 525/341, 344; 524/132

[56] References Cited

U.S. PATENT DOCUMENTS

| | | | |
|---|---|---|---|
| 3,642,728 | 2/1972 | Canter | 525/341 |
| 3,836,511 | 9/1974 | O'Farrell et al. | 525/344 |
| 3,870,841 | 3/1975 | Makowski et al. | 524/141 |
| 4,292,045 | 9/1981 | Brooks et al. | 44/62 |
| 4,372,862 | 2/1983 | Miller | 44/62 |
| 4,396,398 | 8/1983 | Knight | 44/62 |
| 4,516,982 | 5/1985 | Duvdevani et al. | 44/62 |

*Primary Examiner*—John F. Terapane
*Assistant Examiner*—J. E. Thomas

[57] ABSTRACT

A method for improving the antimisting properties of an organic liquid which comprises the step of dissolving about 0.1 to about 3.0 weight percent of a neutralized sulfonated polymer in such organic liquid, having a solubility parameter of less than 9, wherein said neutralized sulfonated polymer has about 5 to about 200 meq. of pendant sulfonate groups per 100 grams of polymer and about 90.0 to 100% of said sulfonate groups are neutralized, wherein the solution of the organic liquid and the neutralized sulfonated polymer has an approximate polymer concentration, $C_A$, which can be characterized by the formula:

$$C_A(\text{gms}/100\text{ ml}) = \frac{0.77}{[\eta]}$$

wherein $[\eta]$ is the intrinsic viscosity of said solution and the polymer concentration range is 0.1 times to 10 times $C_A$.

11 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DILATANT BEHAVIOR OF A SOLUTION OF A SULFONATED POLYMER

FIELD OF THE INVENTION

A process for improving the antimisting properties of a jet aviation fuel.

BACKGROUND OF THE INVENTION

Most polymer solutions exhibit shear thinning (or pseudo-plastic) behavior while simpler, low molecular weight fluids, such as hydrocarbons and water exhibit Newtonian behavior. It was found that solutions of associating polymers can, on the other hand, exhibit shear thickening (or dilatant) behavior regardless of their molecular weight if they are prepared in given concentration ranges. These concentration ranges can be shifted by adding cosolvents that are capable of changing the associating strength or nature according to a criteria that is disclosed below. By properly choosing the cosolvent and adjusting its concentration, the viscosity range of the fluid, as well as its viscous behavior with time under shear, can be altered.

Polymeric materials are useful as viscosity enhancers when dissolved in the appropriate solvent system. The principle reason for this behavior is due primarily to the large volume which a single macromolecular chain can occupy within the solvent. An increase in the size of the chain produces a concomitant enhancement in the solution viscosity. However, when the polymer chain is placed in a shear field, segmental orientation takes place in direction of the shearing force. The viscosity of the fluid dramatically drops due to this orientation phenomena. This is a typical behavior of most solutions containing dissolved polymeric materials. However, if the polymer molecule has a high molecular weight with a relatively flexible backbone and the solvent viscosity is sufficiently high, different behavior is anticipated.

It has been shown by several groups that, with increasing shear rates, the viscosity should show a decrease, followed by a minimum value and a subsequent mild increase in cases where both solvent viscosity and polymer molecular weight are very high. This latter effect gives rise to a mild dilatant behavior. However, the above-mentioned conditions required for the appearance of shear thickening behavior in these polymeric solution systems are not applicable for many technologically interesting fluids. In most of the common synthetic polymers, it is difficult, from a synthetic viewpoint, to obtain sufficiently high molecular weight and, in addition, most solvents (for example, water) have rather low viscosities.

This invention discloses the novel and unexpected result that solutions of sulfonated polymers, which are soluble in a system of an organic liquid are capable of enhancing the viscosity of these solutions under relatively broad shear conditions. With these unique polymeric materials, dilatant behavior occurs in fluids which are of extreme technological utility. It is further observed that under the identical experimental conditions, the viscosity of the individual copolymer components show the normal shear thinning behavior.

The modification of fluids with polymeric additives is of extreme importance in many technological applications. If such a modification can result in a dilatent behavior, additional advantageous applications can result. For example, substantial shear thickening can be useful in antimisting applications where a stream of the modified fluid should not break into a fine mist, particularly if the stream is produced under a shock situation. Such a shock situation also causes flow with high shear rates which will thicken the fluid and prevent the production of a fine mist. The addition of the polymeric material to the jet aviation fuel improves the antimisting properties of the jet avaiation fuel, such that upon subjecting the jet aviation fuel to a shock situation the jet aviation fuel will gel. Another example is lubrication under high shear rates, where a higher viscosity produced by the high shear rates can help in more effectively separating moving surfaces from coming into contact.

SUMMARY OF THE INVENTION

The present invention relates to a process for improving the antimisting properties of a non-polar hydrocarbon liquid, such as jet aviation fuel, which comprises the step of adding a sufficient quantity of a sulfonated polymer to the jet aviation fuel.

GENERAL DESCRIPTION OF THE INVENTION

The present invention relates to a process for improving the antimisting properties of a non-polar hydrocarbon liquid, such as jet aviation fuel, which comprises the step of adding a sufficient quantity of a sulfonated polymer to the jet aviation fuel.

FIGS. 1 and 2 schematically display the generalized behavior of non-Newtonian fluids. In FIG. 1 it is shown that a fluid can exhibit a combination of Newtonian, dilatant and pseudo-plastic responses at various shear rate ranges. Not all the elements shown in FIG. 1 need to be present for one given fluid. If, for example, point A would be extended to infinite shear rate, the liquid would be purely Newtonian. If the portion A, B, C would be missing such as in A, A', and point A' would be made to coincide with point D, the liquid would be an ordinary pseudo-plastic one. Dilatant fluids can show a shear thickening region starting after a Newtonian one such as in A, B or after some shear-thinning as in A, A', B'. A dilatant fluid may exhibit combinations of Newtonian and pseudoplastic responses at very high shear rates.

The behavior shown in FIG. 1 can be an equilibrated response or a pseudo steady-state response (one achieved in flow where higher shear is experienced for short times only, such as in short tubes or dies). In general the fluid can respond with a viscosity or shear stress which changes with time under a given shear rate. This is shown in FIG. 2. If no time dependent viscosity is observed, the viscous response is equilibrated very quickly (relative to the capability of a measuring device to descriminate change under time) and curves A or A' are observed; this is the usual case for low molecular weight liquids and in many cases for polymer solutions as well. Some fluids, usually dispersions or polymer solutions, may exhibit a viscosity change with time under shear, as shown in FIG. 2. When the viscosity grows with time, the fluid is rheopectic and when the viscosity diminishes with time the fluid is thixotropic, as shown by the solid and the broken lines in FIG. 2 respectively. The time dependence is usually more severe at higher shear rates. Also, this discussion is limited to fluids that can reversibly undergo the same behavior after they were allowed to relax under no shear for some time. Liquids that show a permanent viscosity change associated with a permanent structure change with time (such as in a chemical reaction) are of no interest in this invention.

Given a polymer which can exhibit associations between neighboring polymer chains after it has been dissolved in a solvent, such solutions can exhibit shear thickening behavior at given concentration ranges. Moreover, given a cosolvent that can alter the association strength (up or down) the solutions can be made to exhibit shear thickening at various polymer concentrations or at different shear rate ranges while the viscosity levels can also be altered. The "design" criterion developed in this invention is based on the reduced viscosity vs. concentration profiles for a given system.

The necessary element for this invention is an associating polymer solution and the adjustability of the association strength via an adjustment in the polymer structure or the solution nature.

The concentration range in which an associating polymer solution in a solvent, or a solvent modified by the various elements described above shows shear thickening behavior is determined by the reduced viscosity of the system.

FIG. 3 shows a general behavior of reduced viscosity ($\eta$ sp/C) of a polymer solution for an associating and a non-associating polymer of the same family and molecular weight. The difference between both these polymers is either the absence of the associating species in one of the polymers or the "neutralization" of the associating capability in this polymer (via an additive, a chemical change or other means). This point will be further clarified in the example discussed later. The two curves shown in FIG. 3, whether their terminal slope (at zero concentration) is negative, positive or zero will tend to intersect at concentration $C_A$. It is claimed that a shear thickening behavior will be expected to result for the solution of an associating polymer at a concentration range of 0.1 times $C_A$ to 10 times $C_A$ and most preferably in a concentration range of 0.3 times $C_A$ to 3 times $C_A$.

$C_A$ in FIG. 3 will strongly depend on all the elements that were claimed above as being necessary or desired in the solution system. Weakening the association by using a combination of these elements will move $C_A$ up while strengthening the associations will move $C_A$ down. High $C_A$ values will tend to reduce the viscosity level of the shear thickening range to higher shear rates. Increasing $C_A$ by a lower molecular additive will tend to reduce viscosity dependence on time under shear. Inherently weaker associations, which do not require an additive if $C_A$ needs to be increased, will tend to raise the dependence of viscosity on time under shear.

The crossover of the two curves in FIG. 3 can be hypothesized as a probable response of all associating polymers where associations can be mostly intramolecular at low concentration and intermolecular at or above the crossover concentration ($C_A$). Reducing the association level or strength will tend to raise $C_A$ and force the associating curve to coincide with the nonassociating one when all associations have been impaired.

In order for the polymeric solutions of the instant invention to exhibit dilatant behavior the polymer concentration must be such that there is polymer coil overlap. This concentration is deduced on a theoretical basis as being about $$C_A(\text{gms}/100\text{ ml}) = \frac{0.77}{[\eta]}$$

wherein $C_A$ is the concentration of the polymer in solution and $[\eta]$ is the intrinsic viscosity of the solution which is directly related to the molecular weight of the polymer. On this basis, the preferred terminology of 0.3 $C_A$ to 3 $C_A$ is a direct measure of the concentration range of the polymer wherein:

$$C_A = \frac{0.77}{[\eta]}$$

The component materials of the instant process comprise a water insoluble, neutralized sulfonated polymer at a critical solution concentration level of about 0.1 to 3.0 weight percent dissolved in a nonpolar hydrocarbon liquid.

In general, the water insoluble neutralized sulfonated polymer will comprise from about 5 to about 200 meq. pendant sulfonate groups per 100 grams of polymer, more preferably from 10 to 100 meq. pendant sulfonate groups. The sulfonated polymers utilized in the instant invention are generally neutralized with the basic materials selected from Groups IA, IIA, IB and IIB of the Periodic Table of Elements and lead, tin and antimony, as well as ammonium and amine counterions. Elements which are known as transition elements, such as nickel and cobalt, are also useful in neutralizing the sulfonated polymers of the instant invention. Sulfonated polymers which are subject to the process of the instant invention are illimitable and include both plastic and elastomeric polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers. The preferred polymers of the instant invention are ethylene-propylene terpolymers and polystyrene.

Neutralization of the cited polymers with appropriate metal hydroxides, metal acetates, metal oxides, or ammonium hydroxide etc., can be conducted by means well-known in the art. For example, the sulfonation process as with Butyl rubber, containing a small 0.3 to 1.0 mole percent unsaturation, can be conducted in a suitable solvent such as toluene, with acetyle sulfate as the sulfonating agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to ensure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected. Thus, the degree of neutralization of said sulfonate groups may vary from 0 (free acid form) to 100 mole percent, preferably 90 to 100 percent, and most preferably about 99 to about 100 percent. With the utilization of neutralized sulfonated polymers in this instant invention, particularly sulfonated EPDM polymers it is preferred that the degree of neutralization be substantially complete, that is with no substantial free acid present and without substantial excess of the base other than that needed to ensure neutralization. The neutralized sulfonated polymers possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The neutralized sulfonated polymers of the instant invention may vary in number average molecular weight from 1,000 to 10,000,000, preferably from 5,000 to 500,000, most preferably from 10,000 to 200,000. These polymers may be prepared by methods known in the art, for example, see U.S. Pat. No. 3,642,728, hereby incorporated by reference.

The preferred neutralized sulfonated polymers for use in the instant invention, e.g., sulfonated EPDM terpolymers and substituted derivatives thereof, may be by the procedures described in U.S. Pat. No. 3,870,841, filed Oct. 2, 1972, in the names of H. S. Makowski, R. D. Lundberg and G. H. Singhal, hereby incorporated by reference.

The water insoluble, neutralized sulfonated polymers may be incorporated into the hydrocarbon liquid at a level of from 0.1 to 3.0 weight percent and more preferably from 0.1 to 2.00 weight percent, based on the polymer molecular weight and, if present, the amount of polar cosolvent.

Specific examples of preferred sulfonated polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated polypropylene copolymers, (styrene)-acrylic acid copolymers, sulfonated polyisobutylene, sulfonated ethylene-propylene terpolymers, sulfonated polyisoprene, sulfonated polyvinyl toluene, sulfonated polyvinyl toluene copolymers and isoprenestyrene sulfonate copolymers formed by a free radical copolymerization process.

The neutralized sulfonated polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure.

The neutralized sulfonated polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these sulfonated polymers in situ; however, this is not a preferred operation, since in situ neutralization requires preparation of the sulfonic acid in the organic liquid which is to be subjected to the instant process, or the acid form of the sulfonated polymer must be dissolved in said organic liquid. The latter approach may involve handling of an acid form of an sulfonated polymer which has limited thermal stability. Therefore, it is quite apparent that the preparation and isolation of a neutralized sulfonated polymer affords the maximum latitude in formulation, less problems in handling polymers of limited thermal stability and maximum control over the final solution of the neutralized sulfonated polymer, and organic liquid.

The non-polar organic liquids which have a solubility parameter of less than 9.0, which may be utilized in the instant invention, are selected with relation to the sulfonated polymer and vice-versa. The hydrocarbon liquid is selected from the group consisting of aromatic and aliphatic hydrocarbons,gasoline and jet aviation fuel and mixtures thereof.

Specific examples of hydrocarbon liquids to be employed with the various types of polymers are:

| Polymer | Hydrocarbon Liquid |
|---|---|
| sulfonated polystyrene | benzene, toluene, ethyl benzene, xylene, styrene, ethylene dichloride, methylene chloride, jet aviation fuel. |
| sulfonated poly-t-butyl-styrene | benezene, toluene, xylene, ethyl benezene, styrene, t-butyl styrene, aliphatic oils, aromatic oils, hexane, heptane, decane, nonane, and light and heavy fuels jet aviation fuels. |
| sulfonated ethylene-propylene terpolymer | Jet aviation fuel, pentane, aliphatic and aromatic solvents, oils such as Solvent "100 Neutral", "150 Neutral" and similar paraffinic oils, benzene, diesel oil, light fuels, toluene, xylene, ethyl benzene, pentane, hexane, heptane, octane, isooctane, nonane, decane aromatic solvents. |
| sulfonated polyisobutylene | saturated aliphatic hydrocarbons, diisobutylene, triisobutylene, aromatic and alkyl substituted aromatic hydrocarbons, aliphatic oils, oils predominantly paraffinic in nature and mixtures containing naphthenic hydrocarbons. "Solvent 100 Neutral", "Solvent 150 Nuetral" and all related oils, low molecular weight polymeric oils such as squalene, white oils and process oils having 60 percent or less aromatic content, jet aviation fuel. |
| sulfonated polyvinyl toluene | toluene, benzene, xylene, cyclohexane, ethyl benzene, styrene, jet aviation fuel. |

The process of improving the antimisting properties of a jet aviation fuel comprises dissolving about 0.1 to about 1.0 weight percent of the neutralized sulfonated polymer in the jet aviation fuel. The solution of the jet aviation fuel and the neutralized sulfonated polymer, when subjected to shock or a high shear condition, will gel.

DETAILED DESCRIPTION OF THE PREFERRED EMBODIMENT

Figure 1:
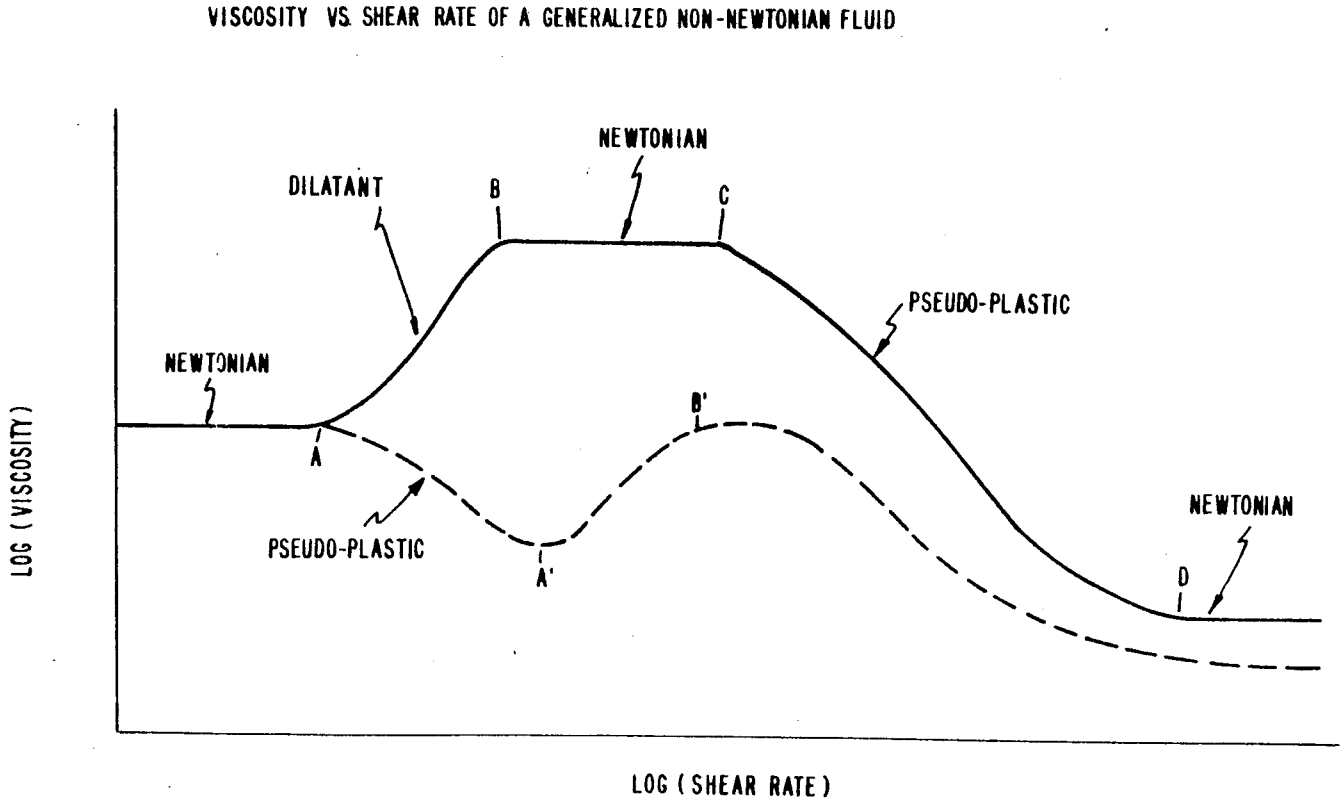
FIG. 1 illustrates a plot of viscosity versus shear rate of a non-newtonian fluid.
Figure 2:
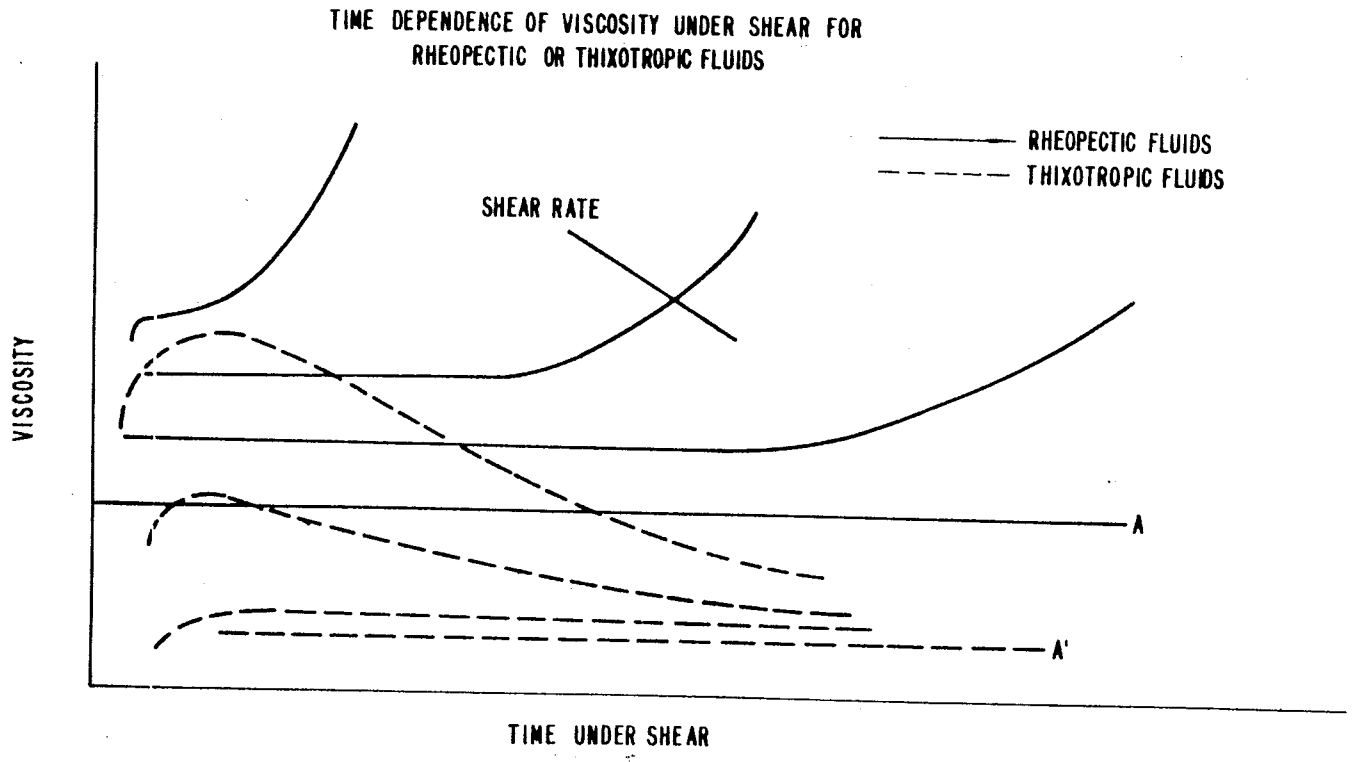
FIG. 2 illustrates a plot of viscosity versus time under shear for rheopectic or thixotropic fluids.
Figure 3:
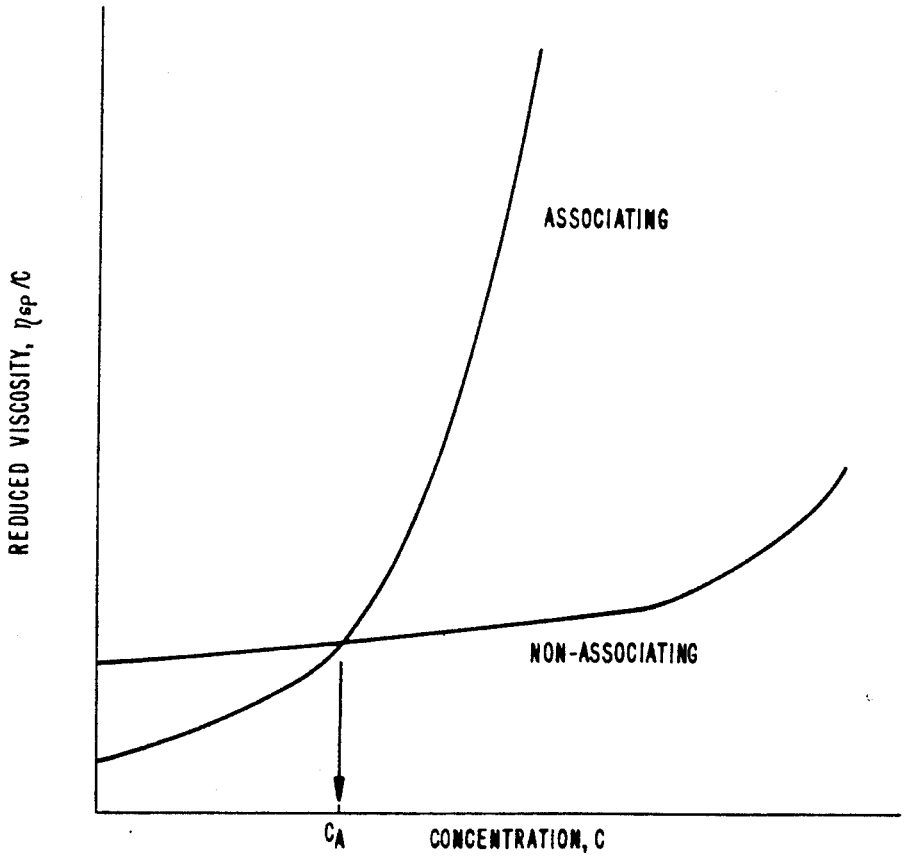
FIG. 3 illustrates a plot of reduced viscosity versus solution concentration for associating and non-associating polymers.

The following examples will demonstrate the performance of sulfonated EPDM terpolymers of varying sulfonate levels in several specific organic liquid solution environments.

EXAMPLE I

One hundred grams of an EPDM terpolymer, Vistalon 2504-20 (a broken-down version of Exxon Chemical Vistalon 2504, having a Mooney viscosity of 20 or about half of the commercial polymer) was dissolved under agitation in 1000 ml. of n-hexane at 40° C. The resultant cement was cooled to room temperature and 5.74 ml. of acetic anhydride (60.75 mmoles) was then added. While stirring the mixture, 2.1 ml. of 95% $H_2SO_4$ (37.5 mmoles) was added dropwise. The sulfonation reaction was quenched after 30 minutes with 150 ml. of isopropanol. The acid form of the sulfonated polymer was analyzed by Dietert Sulfur Analysis to have 33 meq. of S03H groups per 100 grams of sulfonated polymer. To the quenched sulfonated cement was added with stirring for thirty minutes 25.6 grams (90 mmoles/100 grams of EPDM) of stearic acid. A solution of 9.87 grams (90 meq./100 g. of EPDM) of zinc acetate dihydrate dissolved in 25 ml. of distilled water was then added in the cement and the cement stirred for an additional 30 minutes. Antioxidant 2246 (0.5 grams) was then added to the cement. The resultant plasticized, neutralized sulfonated EPDM terpolymer was then isolated by steam stripping and drying on a rubber mill at 220° F., wherein the sulfonated terpolymer has an apparent viscosity at 0.73 $sec^{-1}$ at 200° C. of about $3.3\times10^5$ poise.

EXAMPLE II

A solution of a sulfonated EPDM in xylene was prepared at a concentration of 1.75 weight percent by using a magnetic stirrer.

The sulfonated EPDM was a zinc salt with a sulfonation level of 10 meq./100g (TP-398). The viscosity-shear rate response was studied with a rotational viscometer (Haake CV-100) at 25° . It was found that the solution exhibited a dilatant response as shown in Table I.

TABLE I

Viscosity vs. Shear Rate for a Zinc—Sulfo EPDM Solution in Xylene at 1.75 Wt. % and 25° C.

| Shear Rate $sec^{-1}$ | Viscosity cP |
|---|---|
| 3 | 13 |
| 10 | 152 |
| 20 | 190 |
| 30 | 290 |
| 60 | 590 |

EXAMPLE III

A solution of the sulfonated EPDM described in Example II was prepared in xylene at a concentration of 2.5 weight percent.

The viscosity-shear rate behavior was measured as described in Example II and the results are as shown in Table II.

TABLE II

Viscosity vs. Shear Rate for a Zinc—Sulfo EPDM Solution in Xylene at 2.5 Wt. % and 25° C.

| Shear Rate $sec^{-1}$ | Viscosity cP |
|---|---|
| 3 | 12,300 |
| 5 | 15,600 |
| 7.5 | 19,800 |

Examples II and III demonstrate a dilatant behavior of sulfo EPDM solutions in an organic solvent containing no cosolvent.

What is claimed is:

1. A method for improving the antimisting properties of an organic liquid which comprises the step of dissolving about 0.1 to about 3.0 weight percent of a neutralized sulfonated polymer in such organic liquid, having a solubility parameter of less than 9, wherein said neutralized sulfonated polymer has about 5 to about 200 meq. of pendant sulfonate groups per 100 grams of polymer and about 90.0 to 100% of said sulfonate groups are neutralized, wherein the solution of the organic liquid and the neutralized sulfonated polymer has an approximate polymer concentration, $C_A$, which can be characterized by the formula:

$$C_A(\text{gms}/100\text{ ml}) = \frac{0.77}{[\eta]}$$

wherein $[\eta]$ is the intrinsic viscosity of said solution and the polymer concentration range is 0.1 times $C_A$ to 10 times $C_A$.

2. A method according to claim 1 wherein said sulfonate groups are neutralized within an ammonium or metal counterion.

3. A method according to claim 2 wherein said metal counterion is selected from the group consisting of antimony, tin, lead and Groups IA, IIA, VIA, VIIA, VIIIA, IB and IIB of the Periodic Table of Elements.

4. A method according to claim 1 wherein said neutralized sulfonated polymer is formed from an elastomeric polymer.

5. A method according to claim 4 wherein said elastomeric polymer is selected from the group consisting of EPDM terpolymer and Butyl rubber.

6. A method according to claim 1 wherein said neutralized sulfonated polymer is formed from a thermoplastic.

7. A method according to claim 6 wherein said thermoplastic is selected from the group consisting of polystyrene, t-butyl styrene, ethylene copolymers, propylene copolymers and styrene/acrylonitrile copolymers.

8. A method according to claim 1 wherein said organic liquid is selected from a group consisting of aliphatic hydrocarbons and aromatic hydrocarbons.

9. A method according to claim 1 wherein said organic liquid is selected from the group consisting of benzene, toluene, ethyl benzene, xylene and styrene and mixtures thereof.

10. A method according to claim 1 wherein said neutralized sulfonated polymer is formed from polystyrene.

11. A method according to claim 1 wherein said hydrocarbon liquid is gasoline or a jet aviation fuel.

* * * * *